US009690837B1

(12) United States Patent
Davenport et al.

(10) Patent No.: US 9,690,837 B1
(45) Date of Patent: Jun. 27, 2017

(54) TECHNIQUES FOR PRESERVING REDUNDANT COPIES OF METADATA IN A DATA STORAGE SYSTEM EMPLOYING DE-DUPLICATION

(71) Applicant: EMC Corporation, Hopkinton, MA (US)

(72) Inventors: William C. Davenport, Burlington, MA (US); Marc DeSouter, Wayne, NJ (US)

(73) Assignee: EMC IP Holding Company LLC, Hopkinton, MA (US)

( * ) Notice: Subject to any disclaimer, the term of this patent is extended or adjusted under 35 U.S.C. 154(b) by 910 days.

(21) Appl. No.: 13/930,819

(22) Filed: Jun. 28, 2013

(51) Int. Cl.
  *G06F 13/22* (2006.01)
  *G06F 17/30* (2006.01)

(52) U.S. Cl.
  CPC .............................. *G06F 17/30575* (2013.01)

(58) Field of Classification Search
  CPC .................................................. G06F 17/30575
  See application file for complete search history.

(56) References Cited

U.S. PATENT DOCUMENTS

| | | | | |
|---|---|---|---|---|
| 6,711,162 B1 * | 3/2004 | Ortega | ..................... | H04L 29/06 370/389 |
| 6,810,398 B2 * | 10/2004 | Moulton | ........... | G06F 17/30097 |
| 7,290,072 B2 * | 10/2007 | Quraishi | ............. | G07F 17/3202 463/22 |
| 7,403,974 B1 | 7/2008 | Harris | | |
| 8,032,498 B1 | 10/2011 | Armangau et al. | | |
| 8,131,924 B1 * | 3/2012 | Frandzel | ............... | G06F 3/0608 711/111 |
| 8,301,673 B2 * | 10/2012 | Hyer, Jr. | ............... | G06F 3/0614 707/769 |
| 8,806,096 B1 * | 8/2014 | Patil | ...................... | G06F 3/0689 710/74 |
| 9,063,664 B1 * | 6/2015 | Li | .......................... | G06F 3/0641 |

(Continued)

OTHER PUBLICATIONS

"Vectored I/O"; Wikipedia; Jan. 2011; downloaded from <https://en.wikipedia.org/w/index.php?title=Vectored_I/O&oldid=406764426> in Jun. 2013; 1 page.

(Continued)

*Primary Examiner* — Steven Snyder
*Assistant Examiner* — Christopher Bartels
(74) *Attorney, Agent, or Firm* — BainwoodHuang

(57) ABSTRACT

A method is provided for preserving redundant copies of metadata in a data storage system employing de-duplication. The method includes (a) creating metadata describing a file of a file system stored on the data storage system, (b) buffering the metadata within a metadata buffer of system memory of the data storage system, (c) sending contents of the metadata buffer from system memory to transmission circuitry of the data storage system, (d) directing the transmission circuitry to store the contents of the metadata buffer to a first location of persistent storage of the data storage system, and (e) directing the transmission circuitry to store a modified version of the contents of the metadata buffer to a second location of persistent storage of the data storage system, the first location being different from the second location. A computerized apparatus and a computer program product are also provided for performing a similar method.

24 Claims, 4 Drawing Sheets

(56) References Cited

U.S. PATENT DOCUMENTS

| | | | | |
|---|---|---|---|---|
| 9,280,578 B1* | 3/2016 | Zhou | ............... | G06F 17/30171 |
| 2002/0143795 A1* | 10/2002 | Fletcher | ............... | G06F 8/61 |
| 2002/0184259 A1* | 12/2002 | Akishita | ............... | G06F 21/10 |
| | | | | 715/201 |
| 2004/0186931 A1* | 9/2004 | Maine | ............... | G06F 13/28 |
| | | | | 710/22 |
| 2006/0265568 A1* | 11/2006 | Burton | ............... | G06F 12/0862 |
| | | | | 711/216 |
| 2007/0033330 A1* | 2/2007 | Sinclair | ............... | G06F 3/0605 |
| | | | | 711/103 |
| 2007/0079089 A1* | 4/2007 | Ohran | ............... | G06F 11/1451 |
| | | | | 711/162 |
| 2008/0005198 A1* | 1/2008 | Cobb | ............... | G06F 11/1469 |
| 2008/0010340 A1* | 1/2008 | Orady | ............... | G06F 3/14 |
| | | | | 709/203 |
| 2008/0183958 A1* | 7/2008 | Cheriton | ............... | G06F 12/0223 |
| | | | | 711/108 |
| 2011/0004878 A1* | 1/2011 | Divoux | ............... | G06F 9/4856 |
| | | | | 718/1 |
| 2011/0238914 A1* | 9/2011 | Hirayama | ............... | H03M 7/30 |
| | | | | 711/118 |
| 2013/0275656 A1* | 10/2013 | Talagala | ............... | G06F 12/0246 |
| | | | | 711/103 |
| 2015/0339216 A1* | 11/2015 | Wade | ............... | G06F 11/3688 |
| | | | | 714/38.1 |

OTHER PUBLICATIONS

Robin Harris; "De-Dup: too much of good thing?"; Jun. 2011; downloaded from <http://storagemojo.com/2011/06/27/de-dup-too-much-of-good-thing/> in Jun. 2013; 10 pages.

David Rosenthal; "Deduplicating Devices Considered Harmful"; ACM Queue; May 2011; downloaded from <http://queue.acm.org/detail.cfm?id=1985003> in Jul. 2015; 2 pages.

Ferrous Le Pidoptera; "Scatter Gather List"; Everything2; Aug. 2000; downloaded from <http://everything2.com/title/scatter+gather+list> in Jul. 2015; 1 page.

* cited by examiner

TECHNIQUES FOR PRESERVING REDUNDANT COPIES OF METADATA IN A DATA STORAGE SYSTEM EMPLOYING DE-DUPLICATION

BACKGROUND

Files and directories are organized within file systems of data storage so that they are readily-retrievable by users and applications. File systems use metadata to organize and describe the data stored within the file systems. It is important for the metadata of a file system to be preserved to prevent the file system from becoming corrupted and/or being taken off-line for long-running recovery operations. Some systems prevent loss of file system metadata by mirroring the metadata so that, even if one copy is lost or damaged, an intact copy is readily available to allow the file system to continue operating properly.

SUMMARY

Data stored on persistent storage often includes redundant copies of the same information. For example, persistent storage may store multiple versions of the same file, or versions which have only slight differences affecting a fraction of the total file. Thus, an e-mail attachment received and saved to a file may result in identical content being stored in both a mailbox file and the file separately saved on disk. In order to reduce redundancy and conserve space on storage devices, some systems employ de-duplication operations. De-duplication operations identify redundant storage units (e.g., blocks) and use pointers or other mechanisms to provide redirection and allow only a single copy of storage units to be stored. A file system using de-duplication is thus able to seamlessly provide access to multiple files as distinct objects, even though some (or all) of the underlying storage units that make up the files may be shared among other files.

However, in systems that employ both metadata minoring and de-duplication, the de-duplication operations may operate on the mirrored metadata to delete one of the copies, thus eliminating the benefits of the metadata mirroring and leaving the file system vulnerable to corruption. In order to address this concern, some systems employ a list of blocks not to be de-duplicated and allow the metadata blocks to be marked as such. Other systems apply a salt pattern to mirrored metadata in memory before sending it to storage, preventing de-duplication of the metadata because the original and the mirrored copies are different.

However, the above-described techniques for preserving redundant metadata suffer from deficiencies. For example, it can be difficult to identify all metadata blocks for exclusion from de-duplication. This is especially the case when a virtual file system sits on top of a lower file system and the de-duplication operation is performed on the lower file system as well when a filesystem runs on top of a block abstraction layer which performs the de-duplication. Also, applying a salt pattern to mirrored metadata in memory can be expensive because it requires allocating a separate memory buffer for the salted copy. In systems that service large numbers of file systems, even small increases in the memory resources required to perform operations can lead to inefficiencies. Applying a salt pattern also slows down operations by requiring memory-to-memory copying between the buffers.

In contrast with prior approaches for preserving redundant metadata, an improved technique involves modifying metadata for storage to a mirrored storage location outside of system memory and without the use of a second memory buffer. Thus, de-duplication of redundant metadata is avoided without substantially taxing memory resources or burdening processors and interfaces with buffer-to-buffer copies.

Some embodiments are directed to a method of preserving redundant copies of metadata in a data storage system employing de-duplication. The method includes (a) creating metadata describing a file of a file system stored on the data storage system, (b) buffering the metadata within a metadata buffer of system memory of the data storage system, (c) sending contents of the metadata buffer from system memory to transmission circuitry of the data storage system, (d) directing the transmission circuitry to store the contents of the metadata buffer to a first location of persistent storage of the data storage system, and (e) directing the transmission circuitry to store a modified version of the contents of the metadata buffer to a second location of persistent storage of the data storage system, the first location being different from the second location. Other embodiments are embodiments are directed to a computerized apparatus and a computer program product configured to perform a method similar to that described above.

BRIEF DESCRIPTION OF THE DRAWINGS

The foregoing and other objects, features and advantages will be apparent from the following description of particular embodiments of the present disclosure, as illustrated in the accompanying drawings in which like reference characters refer to the same parts throughout the different views.

DETAILED DESCRIPTION

Embodiments are directed to techniques for modifying metadata for storage to a mirrored storage location outside of system memory and without the use of a second memory buffer.

Figure 1:
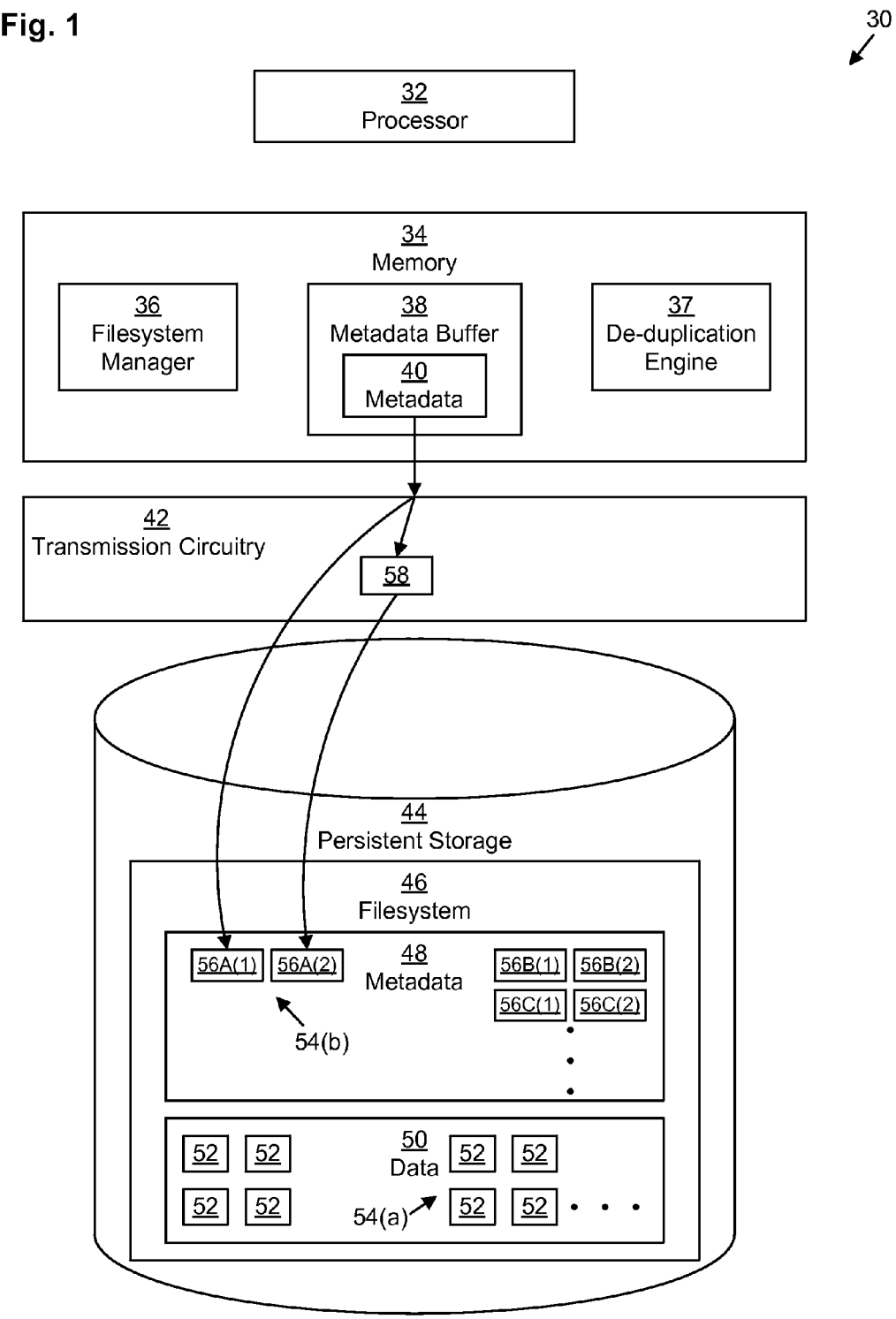
FIG. 1 depicts an example data storage system according to various embodiments.

FIG. 1 depicts an example data storage system (DSS) 30, such as, for example, a NAS data storage system, which provides access to one or more file systems stored thereon. In some embodiments, DSS 30 may be a single computing device, such as, for example, a personal computer, a workstation, a server, an enterprise server, etc. In one particular embodiment, DSS 30 is an enterprise data storage system including a cabinet housing multiple storage processors as well as multiple shelves of hard drives, flash drives, and/or solid state drives (SSDs). An example of an enterprise data storage system is the VNX series data storage system provided by the EMC Corp. of Hopkinton, Mass. In other other embodiments, DSS 30 may be distributed across several computing devices or other structures.

DSS 30 includes one or more processor 32. Processor 32 may be any kind of processor or set of processors configured to perform operations, such as, for example, one or more microprocessors, multi-core microprocessors, digital signal processors, a collection of electronic circuits, or any combination of the above.

DSS 30 also includes memory 34. Memory 34 may include any kind of digital system memory, such as, for example, RAM. Memory 34 stores programs executing on processor 32 as well as data used by those programs. Memory 34 may store an operating system (OS) (not depicted) which runs on processor 32. Memory 34 stores a file system manager 36 which runs on processor 32 and serves to manage a file system stored within the DSS 30 in an improved manner in accordance with embodiments described herein. Memory 34 may also store a de-duplication engine 37 which runs on processor 32 and performs a de-duplication function on the persistent storage 44. Memory 34 also stores a metadata buffer 38 which includes metadata 40 as its contents. It should be understood that the metadata buffer 38, although described as such, is not necessarily limited to storing only metadata (although it does in the example operation described herein). Thus, no specific metadata buffer, as distinct from a data buffer or other type of buffer, is required.

In addition to system memory for storing programs and data in active use by the processor 32, memory 34 may also include persistent storage (e.g., solid-state storage and/or disk-based storage) for storing programs and data even while the DSS 30 is powered off. However, in some embodiments, this persistent storage may additionally (or exclusively) be included within persistent storage 44. OS, improved file system manager 36, and de-duplication engine 37 are typically stored both in system memory and in persistent storage so that they may be loaded into system memory from persistent storage upon a system restart.

The improved techniques described herein, when embodied in one or more non-transient computer-readable media (e.g., file system manager 36 or de-duplication engine 37 stored within either system memory or persistent storage of memory 34), forms a computer program product. Also, the DSS 30, or portions thereof, forms a specialized circuit constructed and arranged to carry out the various processes described herein.

DSS 30 also includes transmission circuitry 42 interposed between memory 34 and persistent storage 44 of the DSS 30. Persistent storage 44 may include one or more hard disk drives, flash drives, and/or SSDs, for example. Persistent storage 44 may be arranged in a fault tolerant arrangement, such as in a redundant array of independent disks (RAID), as is known in the art.

Persistent storage 44 stores at least one file system 46. File system 46 includes both data 50 (i.e., user data stored by a user or application) as well as metadata 48 (e.g., information about the data 50, such as its structure and layout, within the file system 46). The data 50 of the file system 46 is arranged in a set of data blocks 52, which may be arranged into files. One example file 54 is depicted as having a data portion 54(*a*) as well as a metadata portion 54(*b*). The file's metadata portion 54(*b*) includes one or more blocks of metadata, e.g., 56A(1), which pertains to the file 54. Metadata block 56A(1) may be, for example, an inode, containing pointers to the data blocks 52 of the file's data portion 54(*a*) as well as other descriptive information about the file 54 (e.g., creation time, last modification time, size, ownership and permissions, etc.); or an indirect block, containing pointers to the data blocks 52 of the file's data portion 54(*a*). The file's metadata portion 54(*b*) also contains a modified version 56A(2) of the metadata block 56A(1), which may be used in corruption recovery situations but is not susceptible to de-duplication since it is modified. As depicted, the metadata 48 of the file system 46 includes various pairs of metadata blocks 56B(1), 56C(1), . . . , and corresponding modified versions 56B(2), 56C(2), . . . .

In operation, whenever file system manager 36 makes a change to file 54 that entails a metadata change, the metadata block 56A(1) that is to be changed is loaded into memory 34 within metadata buffer 38 as metadata 40. File system driver then modifies the metadata 40 as needed and sends it to the transmission circuitry 42 to be written back to disk as metadata block 56A(1) as well as, in modified form, metadata block 56A(2), after after undergoing a transformation 58 within transmission circuitry 42.

Figure 2:
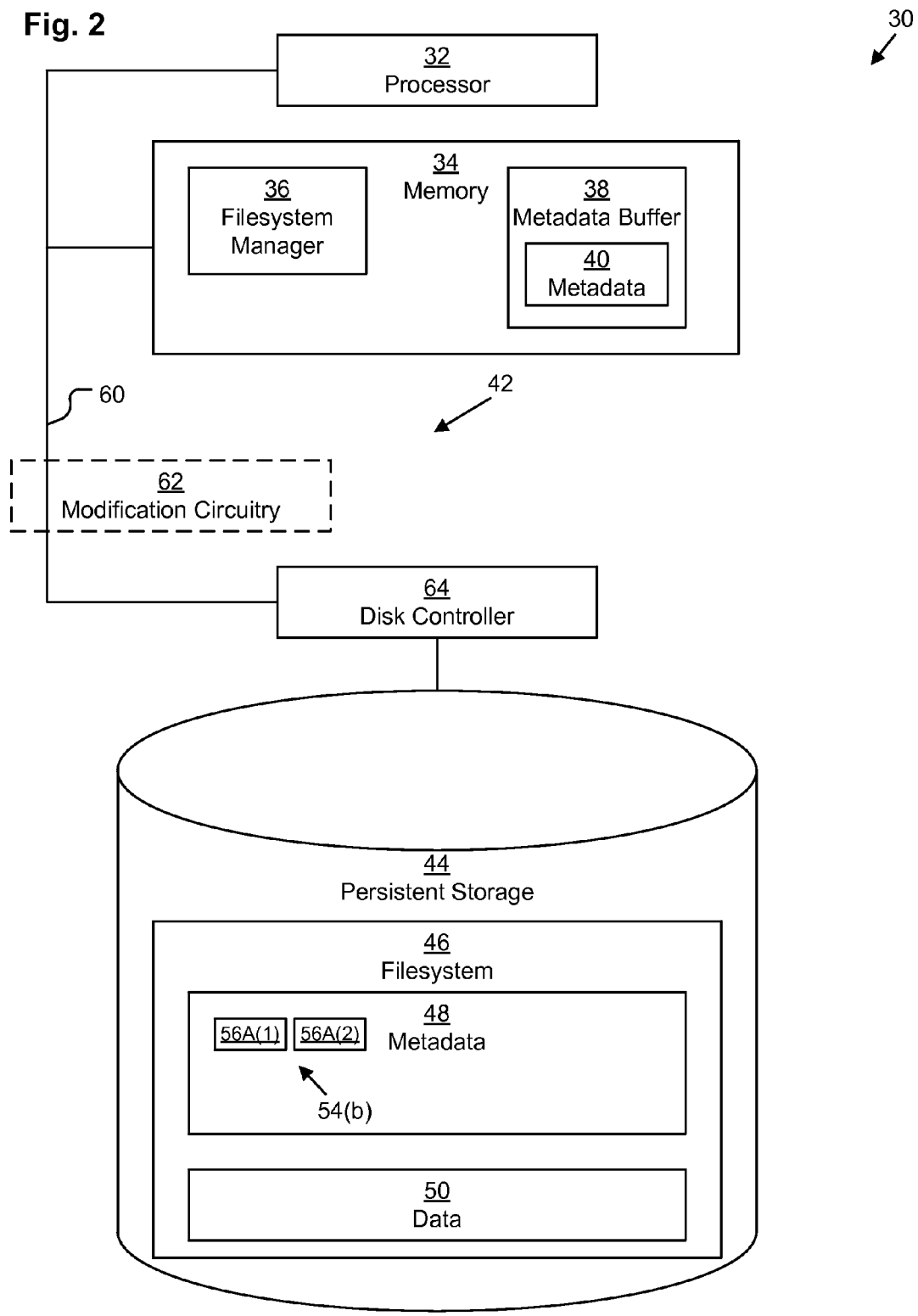
FIG. 2 depicts an example data storage system according to various embodiments according to a different view.

FIG. 2 depicts the example DSS 30 of FIG. 1 according to a different view. In this view, transmission circuitry 42 is made up of a system bus 60, a disk controller 64, and, optionally, modification circuitry 62.

Disk controller 64 provides the processor 32 and memory 34 with access to the persistent storage 44 via system bus 60. System bus 60 is an interconnect that allows data to be efficiently transferred between components 32, 34, 64, for example via direct memory access (DMA) and in a bus mastering manner as is known in the art. It should be understood that all references to DMA refer to the concept that two devices on a bus can communicate with each other without requiring that the communications pass through a central processor, the data passing directly between the two devices over the interconnecting bus. In some embodiments, system bus 60 also includes modification circuitry 62 therein, such as, for example, bitwise negation circuitry configured to negate every bit that passes through it, or XOR circuitry configured to perform a logical exclusive OR (XOR) operation on data that passes through it.

Disk controller 64 may be configured to serve as a bus mastering DMA device capable of issuing DMA access requests to the system bus 60, including scatter-gather requests which allow contents of memory 34 (e.g., the metadata 40 of the metadata buffer 38) to be efficiently transferred to the disk controller 64 in an out-of-order sequence.

Figure 3:
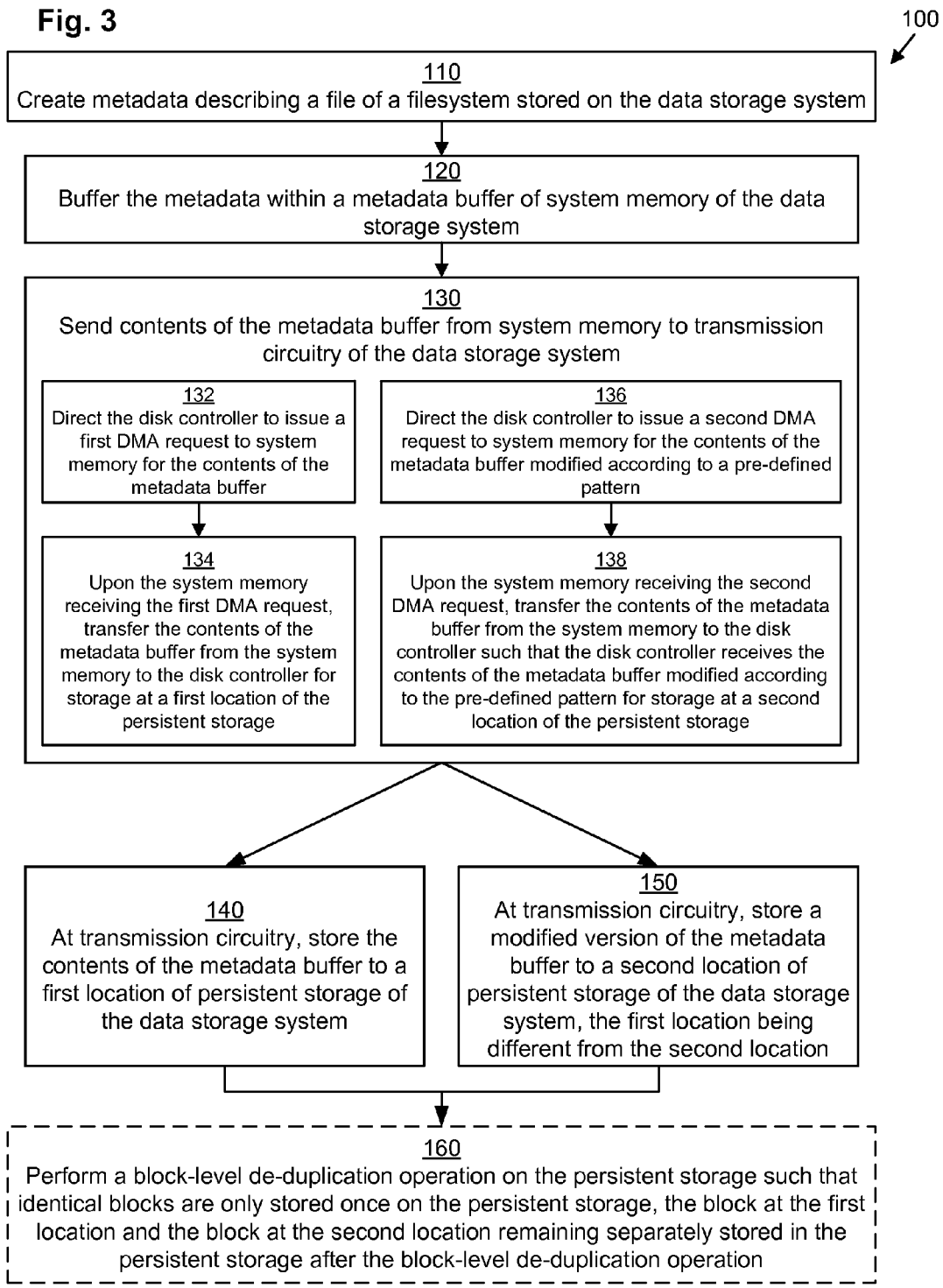
FIG. 3 depicts an example method according to various embodiments.

FIG. 3 depicts an example method 100 performed by the DSS 30 in accordance with various embodiments. Method 100 may be performed by file system manager 36. It should be understood that any time a piece of software, such as, for example, file system manager 36, is described as performing a method, process, step, or function, in an example operation what occurs is that a computing device (e.g., DSS 30) on which that piece of software is running performs the method, process, step, or function when executing that piece of software on its processor (e.g., processor 32). It should also be understood that, in some embodiments, instead of processor 32 executing code of file system manager 36, specialized circuitry of the DSS 30 operates to perform the method, process, step, or function directly in hardware.

In step 110, file system manager 36 creates metadata 40 describing a file 54 of the file system 46. For example, file system manager 36 may create a new file as file 54 of the file system 46, in which case step 110 may include generating the metadata 40 (e.g., an inode and, if the file 54 is large enough, one or more indirect blocks) from scratch to be ultimately stored as one or more metadata block 56A(1) of the file 54 on persistent storage 44. Alternatively, if the file 54 already exists within the file system 46 and changes are being made to the file 54, file system manager 36 may load relevant metadata blocks 56A(1) of the file 54 into memory 34 as metadata 40 and then make any changes to the loaded metadata 40 necessitated by any changes made to the file 54

(e.g., if a new data block 52 is added to the file 54, file system manager may, in step 110, add a pointer to the new data block 52 within the inode or an indirect block of the metadata 40).

In step 120, file system manager 36 buffers the metadata 40 within metadata buffer 38. It should be understood that step 120 may be performed simultaneously with step 110 if the metadata 40 is modified directly within the metadata buffer 38. However, in some embodiments, the metadata 40 may be stored within memory 34 outside of the metadata buffer 38 (not depicted) until the metadata 40 is transferred to the metadata buffer 40 in preparation to be written to persistent storage 44.

In step 130, file system manager 36 sends the contents 40 of the metadata buffer 38 from system memory 34 to the transmission circuitry 42. In some embodiments, step 130 is accomplished by performing two sub-methods 132-134 and 136-138, which may be performed in parallel.

In sub-step 132, file system manager 36 directs the disk controller 64 to issue a first DMA request to the memory 34 for the contents 40 of the metadata buffer 38. In response, the disk controller 64 issues the first DMA request to the memory 34 over the system bus 60. In sub-step 134, in response to the memory 34 receiving the first DMA request, the memory 34 transfers the contents 40 of the metadata buffer 38 to the disk controller 64 over the system bus 60 for ultimate storage at a first location of persistent storage 44, i.e., metadata block 56A(1).

In parallel, in sub-step 136, file system manager 36 directs the disk controller 64 to to issue a second DMA request to the memory 34 for the contents 40 of the metadata buffer 38 modified according to a pre-defined pattern. In response, the disk controller 64 issues the second DMA request to the memory 34 over the system bus 60. In sub-step 138, in response to the memory 34 receiving the second DMA request, the memory 34 transfers the contents 40 of the metadata buffer 38 to the disk controller 64 over the system bus 60 for ultimate storage at a second location of persistent storage 44, i.e., metadata block 56A(2) such that the disk controller 64 receives the contents 40 of the metadata buffer 38 in modified form.

In one embodiment, the second DMA request is a scatter-gather DMA request. A scatter-gather DMA request is a request that asks the memory 34 to transfer its contents over the system bus in an out-of-order sequence. Thus, the disk controller is able to issue a scatter-gather request for the contents 40 of the metadata buffer 38 to be sent across the system bus 60 in a scrambled order. A scatter-gather list typically takes the form of a set of ordered pairs of values, each ordered pair including an offset into the buffer (e.g., metadata buffer 38) and a length (i.e., a number of bytes to transfer starting at the given offset). In some embodiments, the scatter-gather list may also include a starting offset to identify the beginning address of the buffer 38 within memory 34.

Figure 4:
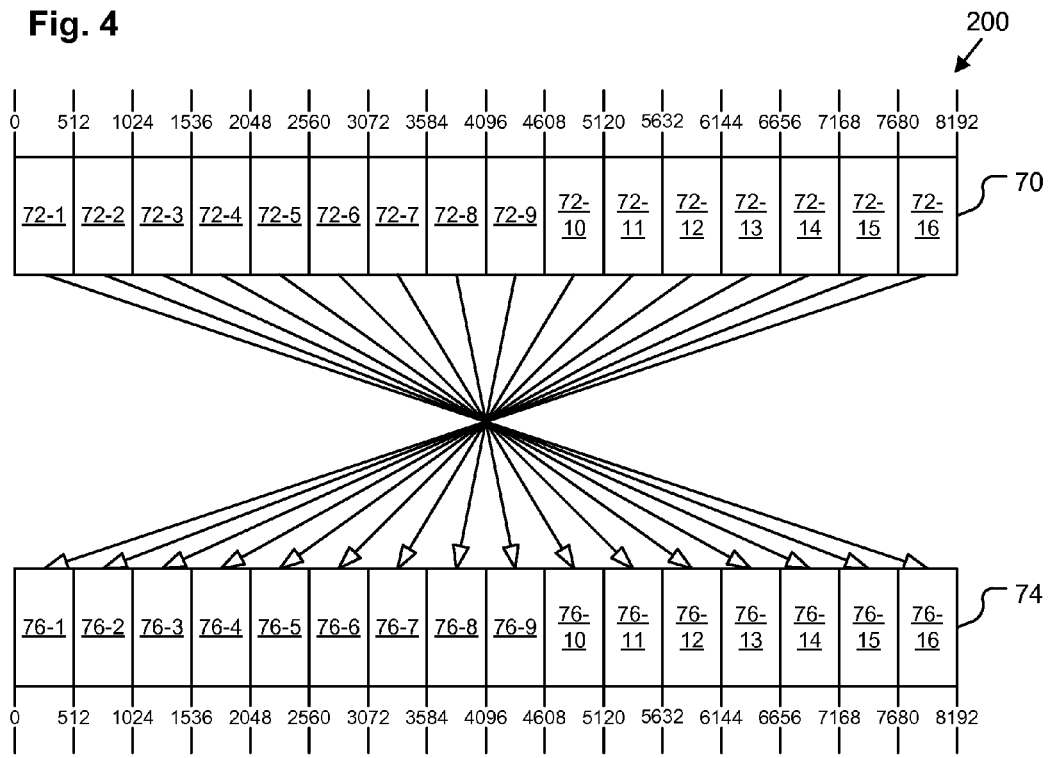
FIG. 4 depicts an example scrambling pattern for use in conjunction with various embodiments.

FIG. 4 depicts an example scatter-gather arrangement 200 according to one embodiment. In this arrangement 200, an 8 KB metadata block 70 from the metadata buffer 38 is transformed into a reversed 8 KB modified metadata block 74 to be stored as modified version 56A(2) in file system 46. As depicted, the 8 KB of the metadata block 70 are divided into sixteen consecutively-numbered 512-byte sectors 72 (depicted as sectors 72-1, 72-2, . . . , 72-16). The order of the sectors 72 is reversed in the modified metadata block 74 such that, for example, the first sector 72-1 of the metadata block 70 becomes the last sector 76-16 of the modified metadata block 74 and the last sector 72-16 of the metadata block 70 becomes the first sector 76-1 of the modified metadata block 74. The modified metadata block 74 therefore contains sixteen 512-byte sectors 76 (depicted as sectors 76-1, 76-2, . . . , 76-16) in reverse order as the original metadata block 70, as depicted in FIG. 4. The scatter-gather list used to generate arrangement 200 may be of the form: [(7680, 512), (7168, 512), (6656, 512), (6144, 512), (5632, 512), (5120, 512), (4608, 512), (4096, 512), (3584, 512), (3072, 512), (2560, 512), (2048, 512), (1536, 512), (1024, 512), (512, 512), (0, 512)].

Figure 5:
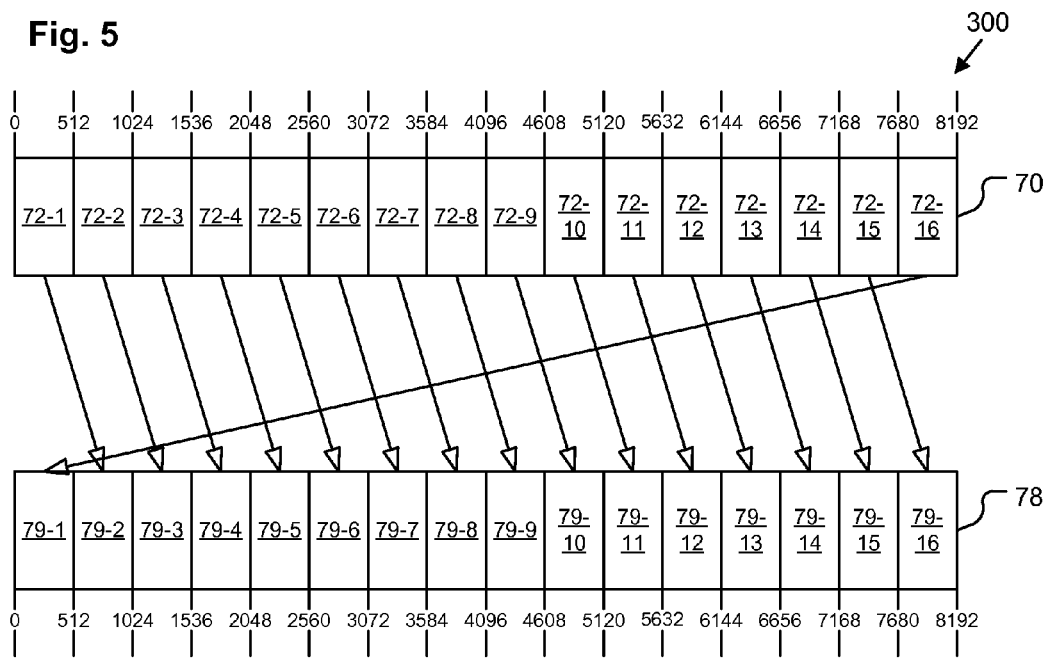
FIG. 5 depicts another example scrambling pattern for use in conjunction with various embodiments.

FIG. 5 depicts an alternate example scatter-gather arrangement 300 according to another embodiment. In this arrangement 300, the 8 KB metadata block 70 from the metadata buffer 38 is transformed into a circularly-shifted 8 KB modified metadata block 78 to be stored as modified version 56A(2) in file system 46. As depicted, the order of the sectors 72 of the metadata block 70 is shifted in the modified metadata block 74 such that, for example, the first sector 72-1 of the metadata block 70 becomes the second sector 79-2 of the modified metadata block 78 and the second sector 72-2 of the metadata block 70 becomes the third sector 79-3 of the modified metadata block 78. Because the transformation is a circular shift operation, the last sector 72-16 of the metadata block 70 wraps around to become the first sector 79-1 of the modified metadata block 78. The modified metadata block 78 therefore contains sixteen 512-byte sectors 79 (depicted as sectors 79-1, 79-2, . . . , 79-16) in a circularly-shifted order from the order of the original metadata block 70, as depicted in FIG. 5. The scatter-gather list used to generate arrangement 300 may be of the form: [(7680, 512), (0, 512), (512, 512), (1024, 512), (1536, 512), (2048, 512), (2560, 512), (3072, 512), (3584, 512), (4096, 512), (4608, 512), (5120, 512), (5632, 512), (6144, 512), (6656, 512), (7168, 512)].

Other scatter-gather arrangements (not depicted) are also possible. As long as the scatter-gather pattern changes the order of bytes (or, in some embodiments, bits) between the metadata block 70 and the modified metadata block 74, 78 such that the two are different, it should suffice to prevent a de-duplication process from storing blocks 56A(1) and 56A(2) in de-duplicated form together. Thus, in one embodiment, the scatter-gather pattern may simply reverse the order of any two bytes, such as for example, the first and last bytes via scatter-gather list [(8191, 1), (1, 8090), (0, 1)]. However, because two bytes might be the same just by chance, it may be wiser to choose a larger portion of the metadata block 70 to be moved around, such as, for example, a 512-byte sector. Also, because the end of a metadata block 56A(1) may be empty (i.e., bytes of value zero), but the beginning of a metadata block 70 will generally contain at least some non-zero bytes, the scatter-gather pattern should move at least some bytes from the beginning of the metadata block 70. Thus, other example scatter-gather lists might be [(512, 512), (0, 512), (1024, 7168)] or [(7680, 512), (512, 7168), (0, 512)].

In other embodiments, the second DMA request may not be a scatter-gather list, but rather a DMA transfer request coupled with an instruction for modification circuitry 62 to modify the metadata block 70 as it is transferred a across the system bus 60. For example, modification circuitry 62 may be configured to perform bitwise negation of all bits as they are transferred across the system bus 60. In such embodiments, the second DMA request may include an instruction for the modification circuitry 62 to negate every bit of the metadata block 70 as it is transferred over the system bus 60, thereby causing the disk controller 64 to receive a negated version of the metadata block 70 to be stored as the modified metadata block 56A(2). As another example, modification circuitry 62 may be configured to perform a serial XOR operation on bits as they traverse the system bus 60. In such embodiments, the second DMA request may include an instruction for the modification circuitry 62 to XOR a set or subset (e.g., the first 256 bits) of the bits of the metadata block 70 as they are transferred over the system bus 60 with a pre-defined salt pattern, thereby causing the disk controller 64 to receive a salted version of the metadata block 70 to be stored as the modified metadata block 56A(2).

In any event, the modification of the metadata within step 136 does not take place within memory 34; rather the modification takes place within transmission circuitry 42, either within modification circuitry 62, or, in the case of scatter-gather, systemically over the system bus 60 by the order in which the disk controller 64 requests the metadata 40. Thus, embodiments provide an advantage over the prior art in that they do not require a second metadata buffer within memory 34, thereby saving expensive memory copy operations as well as memory space.

Returning to FIG. 3, it should be noted that the parallel sub-methods 132-134 and 136-138 may be performed independently or they may share operations. Thus, for example, it is possible that memory 34 sends the contents 40 of the metadata buffer 38 to the the transmission circuitry 42 in both steps 134 and 138 (possibly in a combined manner), however, during the transfer process, transmission circuitry 42 modifies a copy of what it has received. For example, modification circuitry may introduce a second path to disk controller 64, sending the original unmodified metadata block 70 to the disk controller 64 over a first path and sending a negated (or otherwise modified) version of the metadata block 70 to the disk controller 64 over the second path. It is also possible that steps 132 and 136 may be combined, such that, for example, file system manager 36 directs the disk controller 64 to issue a single DMA request to the memory 34 for the contents 40 of the metadata buffer 38 and to have transmission circuitry 42 both modify it according to the pre-defined pattern and leave a version unmodified. Or file system manager 36 may simultaneously direct the disk controller 64 to issue a both a first DMA request to the memory 34 for the unmodified contents 40 of the metadata buffer 38 and a second DMA request to the memory 34 for the contents 40 of the metadata buffer 38 modified according to the pre-defined pattern Steps 140 and 150, which may be performed in parallel, are performed after step 130. In step 140, the transmission circuitry 42 (in one embodiment, specifically the disk controller 64) stores the received unmodified metadata block 70 to the first location of the persistent storage (e.g., 56A(1)). In some embodiments, file system manager 36 sends a command directing the transmission circuitry 42 to store the contents 40 of the metadata buffer 38 to the first location prior to the transmission circuitry performing step 140; in some embodiments this command is sent together with the command in step 132.

In step 150, the transmission circuitry 42 (in one embodiment, specifically the disk controller 64) stores the received modified metadata block 74, 78 to the second location of the persistent storage (e.g., 56A(2)). In some embodiments, file system manager 36 sends a command directing the transmission circuitry 42 to store a modified version of the contents 40 of the metadata buffer 38 to the second location prior to the transmission circuitry performing step 150; in some embodiments this command is sent together with the command in step 136.

Having stored the metadata 40 within the file system 46 of persistent storage 44 in two distinct forms and locations 56A(1), 56(2), steps 110-150 may be repeated as often as the metadata within 56A(1) changes due to changes to file 54. In addition, at some point after completing steps 110-150, optional step 160 may also be performed. In optional step 160, de-duplication engine 37 performs a block-level de-duplication operation on the persistent storage 44 such that identical blocks are only stored once on the persistent storage 44, block 56A(1) and block 56A(2) remaining separately stored in the persistent storage 44 after the block-level de-duplication operation due to the differences introduced within transmission circuitry 42 to block 56A(2).

Thus, techniques have been described for modifying metadata 40 for storage to a mirrored storage location 56A(2) without the use of a second memory buffer.

While various embodiments of the present disclosure have been particularly shown and described, it will be understood by those skilled in the art that various changes in form and details may be made therein without departing from the spirit and scope of the present disclosure as defined by the appended claims.

For example, although embodiments have been described in the context of metadata protection, other embodiments may be directed to non-metadata applications. Thus, if certain important data within a system is desired to be mirrored without the minoring being undone by de-duplication, blocks containing the important data can be flagged so that the file system manager 36 is directed to mirror those flagged blocks with one copy being modified in a similar manner to that described above in the context of the metadata, so that the important data blocks will be stored on persistent storage 44 in an original form (similar to 56A(1)) and in a modified (e.g., scrambled) form (similar to 56A(2)).

As an additional example, although various embodiments have been described as being methods, software embodying these methods is also included. Thus, one embodiment includes a tangible non-transient computer-readable medium (such as, for example, a hard disk, a floppy disk, an optical disk, computer memory, flash memory, etc.) programmed with instructions, which, when performed by a computer or a set of computers, cause one or more of the methods described in various embodiments to be performed. Another embodiment includes a computer which is programmed to perform one or more of the methods described in various embodiments.

Furthermore, it should be understood that all embodiments, examples, and variants which have been described may be combined in all possible combinations with each other, and are hereby combined, except to the extent that such combinations have been explicitly excluded.

Finally, even if a technique, method, apparatus, or other concept is specifically labeled as "background" or "conventional," Applicants make no admission that such technique, method, apparatus, or other concept is actually prior art under 35 U.S.C. §102 or 35 U.S.C. §103, such determination being a legal determination that depends upon many factors, not all of which are known to Applicants at this time. As an example, a technique may be labeled "background" even though it was first practiced by the Applicants less than one year prior to the filing date, falling under the exception under 35 U.S.C. §103(c).

What is claimed is:

1. A method of preserving redundant copies of metadata in a data storage system employing de-duplication, the method comprising:

creating metadata describing a file of a file system stored on the data storage system;
buffering the metadata within a metadata buffer of system memory of the data storage system;
sending contents of the metadata buffer from system memory to transmission circuitry of the data storage system;
directing the transmission circuitry to store the contents of the metadata buffer to a first location of persistent storage of the data storage system; and
directing the transmission circuitry to store a modified version of the contents of the metadata buffer to a second location of persistent storage of the data storage system, the first location being different from the second location; wherein:
the contents of the metadata buffer include a block of file system metadata, the block of file system metadata including an integer number of sectors of file system metadata arranged in a sector order from a first sector to a last sector;
sending the contents of the metadata buffer from system memory to the transmission circuitry includes:
 transferring the contents of the metadata buffer from the system memory to the transmission circuitry for storage at the first location of the persistent storage; and
 transferring the contents of the metadata buffer from the system memory to the disk controller such that the disk controller receives the contents of the metadata buffer with the sector order reversed such that the last sector is first and the first sector is last, thereby creating the modified version of the contents of the metadata buffer.

2. The method of claim 1, wherein:
the transmission circuitry includes a disk controller; and
sending the contents of the metadata buffer from system memory to the transmission circuitry includes:
 directing the disk controller to issue a first direct memory access (DMA) request to system memory for the contents of the metadata buffer;
 directing the disk controller to issue a second DMA request to system memory for the contents of the metadata buffer modified according to a pre-defined pattern;
 upon the system memory receiving the first DMA request, transferring the contents of the metadata buffer from the system memory to the disk controller for storage at the first location of the persistent storage; and
 upon the system memory receiving the second DMA request, transferring the contents of the metadata buffer from the system memory to the disk controller such that the disk controller receives the contents of the metadata buffer modified according to the pre-defined pattern for storage at the second location of the persistent storage, thereby creating the modified version of the contents of the metadata buffer.

3. The method of claim 2 wherein:
the transmission circuitry further includes a system bus interconnecting the system memory and the disk controller;
the second DMA request is a scatter-gather request; and
transferring the contents of the metadata buffer from the system memory to the disk controller such that the disk controller receives the contents of the metadata buffer modified according to the pre-defined pattern includes transferring the contents of the metadata buffer from the system memory to the system bus in an order defined by the pre-defined pattern in a scatter-gather manner.

4. The method of claim 3 wherein:
the contents of the metadata buffer include a block of file system metadata, the block of file system metadata including exactly an integer number of sectors of file system metadata arranged in a sector order from a first sector to a last sector;
the pre-defined pattern encodes a reversal of the sector order from the last sector to the first sector; and
transferring the contents of the metadata buffer from the system memory to the system bus in the order defined by the pre-defined pattern in the scatter-gather manner includes transferring the last sector first and the first sector last.

5. The method of claim 4 wherein:
a size of each sector is 512 bytes;
each block contains exactly sixteen sectors (numbered 0 through 15); and
the pre-defined pattern is a scatter-gather list of the form [(7680, 512), (7168, 512), (6656, 512), (6144, 512), (5632, 512), (5120, 512), (4608, 512), (4096, 512), (3584, 512), (3072, 512), (2560, 512), (2048, 512), (1536, 512), (1024, 512), (512, 512), (0, 512)].

6. The method of claim 3 wherein the pre-defined pattern encodes a circular shift.

7. The method of claim 3 wherein the pre-defined pattern encodes a reversal in relative order of one pair of bytes of the contents of the metadata buffer.

8. The method of claim 2 wherein:
the transmission circuitry further includes a system bus interconnecting the system memory and the disk controller, the system bus including negation circuitry;
the pre-defined pattern is a bitwise negation pattern; and
transferring the contents of the metadata buffer from the system memory to the disk controller such that the disk controller receives the contents of the metadata buffer modified according to the pre-defined pattern includes:
 transferring the contents of the metadata buffer from the system memory to the system bus; and
 negating the contents of the metadata buffer received by the system bus in a bitwise manner by the negation circuitry of the system bus before being received by the disk controller.

9. The method of claim 2 wherein:
the transmission circuitry further includes a system bus interconnecting the system memory and the disk controller, the system bus including bitwise XOR circuitry;
the pre-defined pattern is a salt pattern to be added to the contents of the metadata buffer via a bitwise exclusive OR (XOR) operation; and
transferring the contents of the metadata buffer from the system memory to the disk controller such that the disk controller receives the contents of the metadata buffer modified according to the pre-defined pattern includes:
 transferring the contents of the metadata buffer from the system memory to the system bus; and
 adding the salt pattern in a bitwise XOR operation to the contents of the metadata buffer received by the system bus by the bitwise XOR circuitry before being received by the disk controller.

10. The method of claim 1 wherein the method further comprises:
sending data of the file to transmission circuitry of the data storage system; and directing the transmission circuitry to store the data of the file to a third location of persistent storage of the data storage system without directing the transmission circuitry to store a modified version of the data of the file to persistent storage of the data storage system.

11. The method of claim 1 wherein the method further comprises performing a block-level de-duplication operation on the persistent storage such that identical blocks are maintained in only one location of the persistent storage, metadata contents of the first location and metadata contents of the second location both remaining maintained in the persistent storage after the block-level de-duplication operation.

12. A computer program product comprising a non-transitory computer-readable storage medium storing a set of instructions, which, when executed by a controller of a data storage system, cause the data storage system to perform the operations of:
  creating metadata describing a file of a file system stored on the data storage system;
  buffering the metadata within a metadata buffer of system memory of the data storage system;
  sending contents of the metadata buffer from system memory to transmission circuitry of the data storage system;
  directing the transmission circuitry to store the contents of the metadata buffer to a first location of persistent storage of the data storage system; and
  directing the transmission circuitry to store a modified version of the contents of the metadata buffer to a second location of persistent storage of the data storage system, the first location being different from the second location; wherein sending the contents of the metadata buffer from system memory to the transmission circuitry includes:
  transferring the contents of the metadata buffer from the system memory to the transmission circuitry for storage at the first location of the persistent storage; and
  transferring the contents of the metadata buffer from the system memory to the disk controller such that the disk controller receives the contents of the metadata buffer modified according to a circular shift, thereby creating the modified version of the contents of the metadata buffer.

13. The computer program product of claim 12, wherein:
the transmission circuitry includes a disk controller; and
sending the contents of the metadata buffer from system memory to the transmission circuitry includes:
  directing the disk controller to issue a first direct memory access (DMA) request to system memory for the contents of the metadata buffer;
  directing the disk controller to issue a second DMA request to system memory for the contents of the metadata buffer modified according to a pre-defined pattern;
  upon the system memory receiving the first DMA request, transferring the contents of the metadata buffer from the system memory to the disk controller for storage at the first location of the persistent storage; and
  upon the system memory receiving the second DMA request, transferring the contents of the metadata buffer from the system memory to the disk controller such that the disk controller receives the contents of the metadata buffer modified according to the pre-defined pattern for storage at the second location of the persistent storage, thereby creating the modified version of the contents of the metadata buffer.

14. The computer program product of claim 13 wherein:
the transmission circuitry further includes a system bus interconnecting the system memory and the disk controller;
the second DMA request is a scatter-gather request; and
transferring the contents of the metadata buffer from the system memory to the disk controller such that the disk controller receives the contents of the metadata buffer modified according to the pre-defined pattern includes transferring the contents of the metadata buffer from the system memory to the system bus in an order defined by the pre-defined pattern in a scatter-gather manner.

15. The computer program product of claim 14 wherein:
the contents of the metadata buffer include a block of file system metadata, the block of file system metadata including exactly an integer number of sectors of file system metadata arranged in a sector order from a first sector to a last sector;
the pre-defined pattern encodes a reversal of the sector order from the last sector to the first sector; and
transferring the contents of the metadata buffer from the system memory to the system bus in the order defined by the pre-defined pattern in the scatter-gather manner includes transferring the last sector first and the first sector last.

16. The computer program product of claim 14 wherein the pre-defined pattern encodes a reversal of one pair of bytes of the contents of the metadata buffer.

17. An apparatus comprising:
persistent storage;
transmission circuitry;
system memory; and
a processor, the processor being constructed and arranged to:
  create metadata describing a file of a file system stored on the apparatus;
  buffer the metadata within a metadata buffer of the system memory;
  send contents of the metadata buffer from the system memory to the transmission circuitry;
  direct the transmission circuitry to store the contents of the metadata buffer to a first location of the persistent storage; and
  direct the transmission circuitry to store a modified version of the contents of the metadata buffer to a second location of the persistent storage, the first location being different from the second location; wherein:
  the contents of the metadata buffer include a block of file system metadata, the block of file system metadata including an integer number of sectors of file system metadata arranged in a sector order from a first sector to a last sector;
  sending the contents of the metadata buffer from system memory to the transmission circuitry includes:
    transferring the contents of the metadata buffer from the system memory to the transmission circuitry for storage at the first location of the persistent storage; and
    transferring the contents of the metadata buffer from the system memory to the disk controller such that the disk controller receives the contents of the metadata buffer with the sector order reversed such that the last sector is first and the first sector is last, thereby creating the modified version of the contents of the metadata buffer.

18. The apparatus of claim 17, wherein:
the transmission circuitry includes a disk controller; and
the processor, in being constructed and arranged to send the contents of the metadata buffer from system memory to the transmission circuitry, is further constructed and arranged to:
   direct the disk controller to issue a first direct memory access (DMA) request to the system memory for the contents of the metadata buffer;
   direct the disk controller to issue a second DMA request to the system memory for the contents of the metadata buffer modified according to a pre-defined pattern;
   upon the system memory receiving the first DMA request, transfer the contents of the metadata buffer from the system memory to the disk controller for storage at the first location of the persistent storage; and
   upon the system memory receiving the second DMA request, transfer the contents of the metadata buffer from the system memory to the disk controller such that the disk controller receives the contents of the metadata buffer modified according to the pre-defined pattern for storage at the second location of the persistent storage, thereby creating the modified version of the contents of the metadata buffer.

19. The apparatus of claim 18 wherein:
the transmission circuitry further includes a system bus interconnecting the system memory and the disk controller in a bus-mastering DMA manner;
the second DMA request is a scatter-gather request; and
transferring the contents of the metadata buffer from the system memory to the disk controller such that the disk controller receives the contents of the metadata buffer modified according to the pre-defined pattern includes transferring the contents of the metadata buffer from the system memory to the system bus in an order defined by the pre-defined pattern in a scatter-gather manner.

20. The apparatus of claim 19 wherein:
the contents of the metadata buffer include a block of file system metadata, the block of file system metadata including exactly an integer number of sectors of file system metadata arranged in a sector order from a first sector to a last sector;
the pre-defined pattern encodes a reversal of the sector order from the last sector to the first sector; and
transferring the contents of the metadata buffer from the system memory to the system bus in the order defined by the pre-defined pattern in the scatter-gather manner includes transferring the last sector first and the first sector last.

21. The apparatus of claim 19 wherein the pre-defined pattern encodes a reversal of one pair of bytes of the contents of the metadata buffer.

22. The apparatus of claim 18 wherein:
the transmission circuitry further includes a system bus interconnecting the system memory and the disk controller, the system bus including negation circuitry;
the pre-defined pattern is a bitwise negation pattern; and
transferring the contents of the metadata buffer from the system memory to the disk controller such that the disk controller receives the contents of the metadata buffer modified according to the pre-defined pattern includes:
   transferring the contents of the metadata buffer from the system memory to the system bus; and
   negating the contents of the metadata buffer received by the system bus in a bitwise manner by the negation circuitry of the system bus before being received by the disk controller.

23. A method of preserving redundant copies of flagged data in a data storage system employing de-duplication, the method comprising:
   buffering the flagged data within a flagged data buffer of system memory of the data storage system;
   sending contents of the flagged data buffer from system memory to transmission circuitry of the data storage system;
   directing the transmission circuitry to store the contents of the flagged data buffer to a first location of persistent storage of the data storage system; and
   directing the transmission circuitry to store a modified version of the contents of the flagged data buffer to a second location of persistent storage of the data storage system, the first location being different from the second location;
wherein sending the contents of the flagged data buffer from system memory to the transmission circuitry includes:
   transferring the contents of the flagged data buffer from the system memory to the transmission circuitry for storage at the first location of the persistent storage; and
   transferring the contents of the flagged data buffer from the system memory to the disk controller such that the disk controller receives the contents of the flagged data buffer modified according to a circular shift, thereby creating the modified version of the contents of the flagged data buffer.

24. The method of claim 23 wherein the method further comprises:
   sending unflagged data to transmission circuitry of the data storage system; and
   directing the transmission circuitry to store the unflagged data to a third location of persistent storage of the data storage system without directing the transmission circuitry to store a modified version of the unflagged data to persistent storage of the data storage system.

* * * * *